A. J. OEHRING.
ATTACHMENT FOR CAMERAS.
APPLICATION FILED DEC. 13, 1915.
1,304,361.
Patented May 20, 1919.
2 SHEETS—SHEET 1.
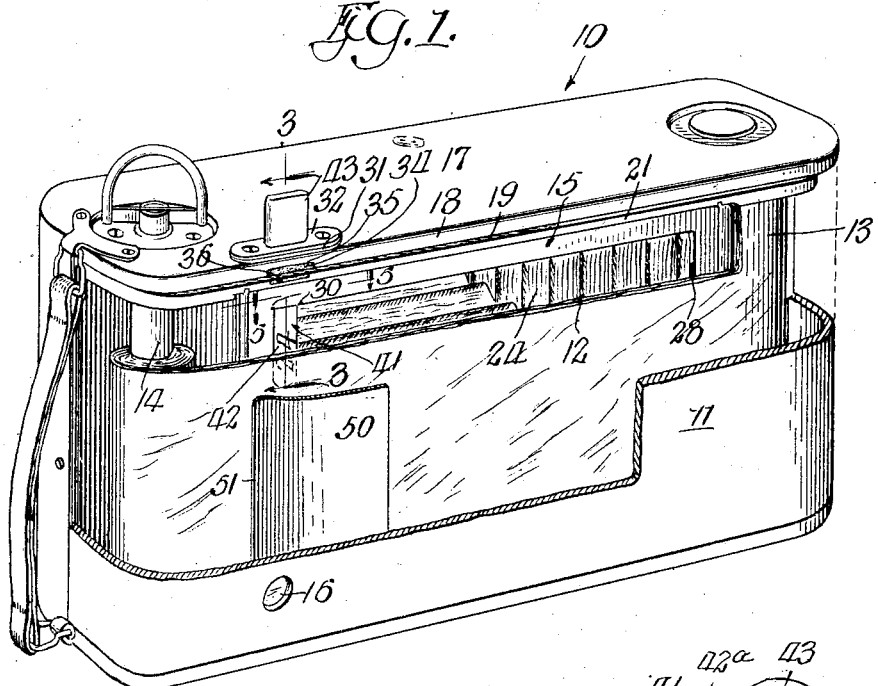
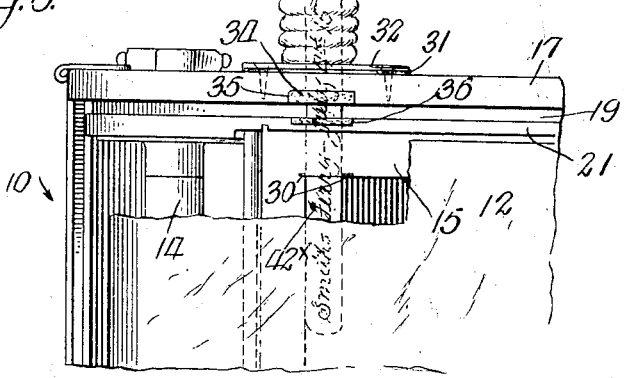
Witnesses:
Inventor
August J. Oehring

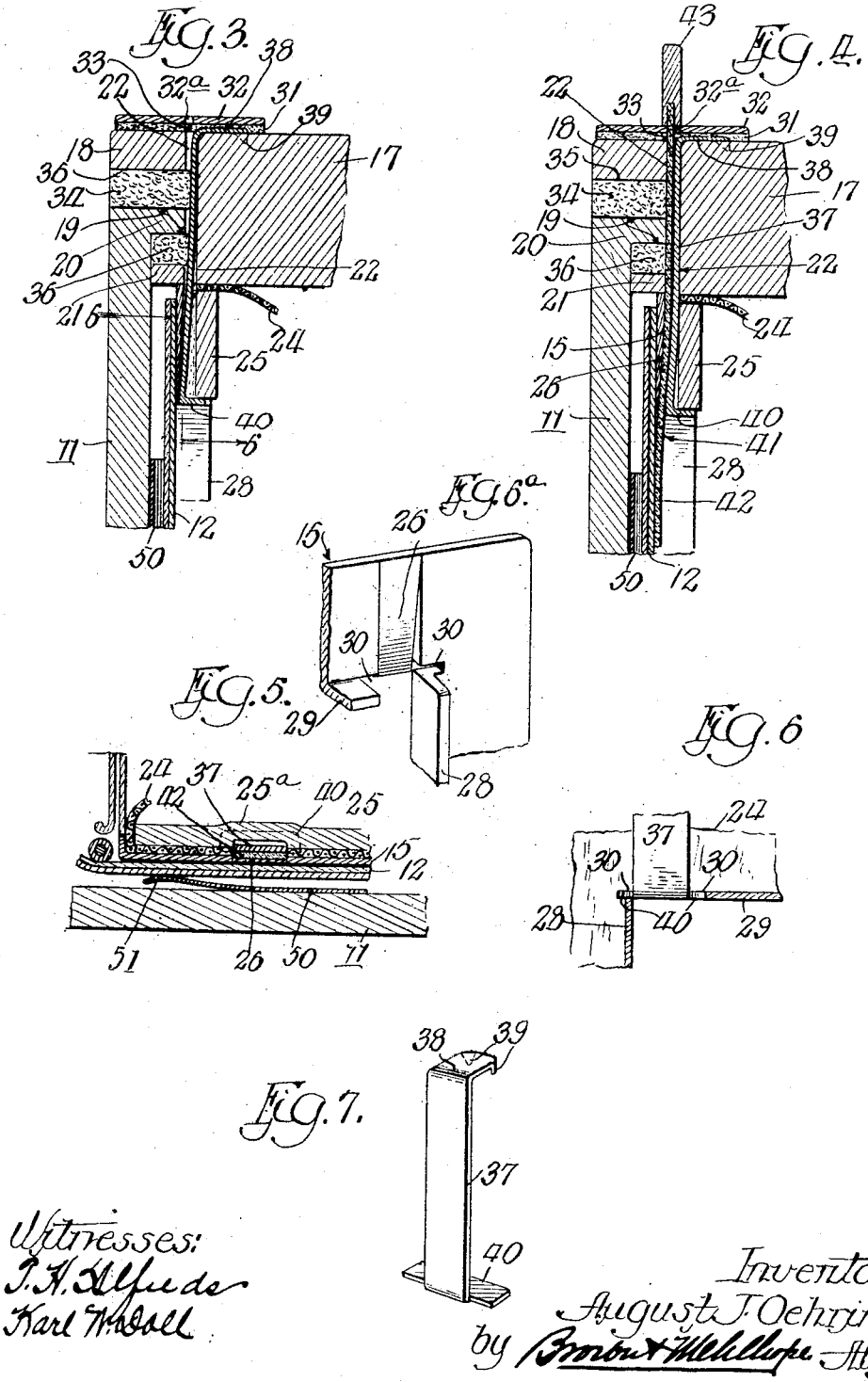

UNITED STATES PATENT OFFICE.

AUGUST J. OEHRING, OF CHICAGO, ILLINOIS.

ATTACHMENT FOR CAMERAS.

1,304,361.      Specification of Letters Patent.      Patented May 20, 1919.

Application filed December 13, 1915. Serial No. 66,410.

*To all whom it may concern:*

Be it known that I, AUGUST J. OEHRING, a citizen of the United States, and a resident of Chicago, in the county of Cook and State of Illinois, have invented certain new and useful Improvements in Attachments for Cameras; and I do hereby declare that the following is a full, clear, and exact description thereof, reference being had to the accompanying drawings and to the letters of reference marked thereon, which form a part of this specification.

This invention relates to improvements in cameras and consists of the matters hereinafter described and more particularly pointed out in the appended claims.

The object of the invention is to provide a camera with a simple and efficient attachment for photographing upon the film, simultaneously with the exposure in taking the picture, an identifying mark, number, or other writing or memorandum of such kind that an inspection of the film or of the picture printed from the film will either show at a glance the identifying memorandum or other data intended to be associated with it, or will show a number or mark which in connection with a properly kept record of any suitable kind, will do the same thing.

Attachments with the same end in view have been heretofore made and applied to cameras, but they have not proven commercially practicable nor has their use met with entire success.

The object of my invention is to provide an attachment of the kind described which is of simple construction, which may be readily and cheaply applied to any camera, which may be used with the greatest convenience and which will be operated to produce the result, that is to say, the identifying mark or the like on the film, at the same time that the film exposure is made. The various advantages of my invention will appear more clearly as I proceed with my specification.

In the drawings:—

Figure 1 is a perspective view of the familiar folding pocket camera with a part of the rear wall broken away to show the inner parts of the camera.

Fig. 2 is a perspective view of a printing plate or slide forming part of my improved attachment.

Fig. 3 is a view on an exaggerated scale, representing a partial vertical section through Fig. 1 in a plane indicated by the line 3—3 of Fig. 1.

Fig. 4 is a view similar to Fig. 3 with the printing plate or slide in place as it is when the exposure is to be made.

Fig. 5 is a view representing on a like scale a horizontal partial section through Fig. 1 in a plane indicated by the line 5—5 of Fig. 1.

Fig. 6 is a view representing a partial vertical section through Fig. 5 in a plane indicated by the line 6—6 of Fig. 3.

Fig. 6$^a$ is a detail perspective view on an exaggerated scale of a part of the frame defining the film exposure area.

Fig. 7 is a perspective view of a part of the attachment to be referred to more particularly later.

Fig. 8 is a view showing a partial rear elevation of the camera with the rear wall removed and illustrating the use of a modified form of the printing plate or slide.

Referring now to that embodiment of my invention illustrated in the drawings:—10 indicates the elongated, shallow box of a camera and 11 the rear, removable closure or wall. The camera is shown as of the familiar flat, folding bellows type. 12 indicates a film which is unwound from a roll 13 at one end of the camera box and rewound on a roll 14 at the other end of the camera box, passing over and in contact with a frame 15 which defines the contact and exposure area of the film. Sight marks on the rear face of the film are noted through an opening 16 in a familiar manner to determine when the successive films are brought to proper position with respect to the frame 15. This part of the camera may be of any usual or desirable construction and forms no part of my invention.

17 indicates the top wall of the camera box. This wall has a rear edge 18 in which is formed a groove 19 for the engagement of a flange 20 at the top of the closure wall 11 and an inset shoulder 21 against which said wall closes in the usual way. A narrow slot 22 is formed in the top box wall 17 in a plane parallel to the plane in which the film 12 moves when wound from one roll to the other, the plane of said slot being located closely adjacent to the plane of said film. This slot is located in a position so that it will be opposite the extreme upper left hand corner of the exposure area of the film.

The frame 15 is an open, rectangular, metallic frame fixed in an upright position in the box in such a manner as to define the exposure film area and to provide a support for the film. 24 indicates the fabric of the bellows which is secured between said frame and a metal strip 25 attached to the box in any usual or familiar manner. The slot 22 is continued down between the frame 15 and the strip 25 in the following manner: The frame 15 is cut away between parallel lines (as indicated at 26 in Fig. 6ª) so as to form a slot-like recess in said frame which is of the thickness of the metal of the frame 15 at the bottom end and is reduced to nothing at its top end. The metal strip 25 is bent outwardly as indicated at 25ª (see Fig. 5), in such manner as to form, when the plate and frame are brought together, a slot which is of slight thickness at the top end, but of greater thickness at the bottom end. The frame 15 has a stiffening flange 28 extending about it, and the horizontal part 29 of this flange is cut away at each side of the slot as indicated at 30.

In order to protect the slot 22 as securely as possible from the entrance of light, it is covered at the top by means of a flat strip of felt 31 which entirely closes it and which is held in place by means of an escutcheon plate 32 attached to the top wall of the box. The felt has a slit 33 in the plane of the slot for a purpose presently to be described, and the plate 32 has a slot 32ª of substantially the area of the slot 22.

To further prevent the entrance of light, a block or strip of felt 34, is let into a recess 35 formed in the top wall 17 of the camera box above the plane of the groove 19, said block of felt extending into the slot 22. In addition, a second block of felt 36 is let into a recess in the inset part 21 of the box top, said felt also projecting into the slot 22. Thus the flange 20 of the rear cover 11 is engaged in the neighborhood of the slot between the two felt strips and light is prevented from entering about the edges of said flange. In addition, said felt strips act to obstruct the entrance of light through the slot 22.

37 indicates a narrow spring plate which extends vertically through the slot 22 and which has a horizontal tongue 38 at its upper end securely engaged between the felt strip 31 and the top wall of the camera box. Preferably this horizontal part has short integral detents 39 which may be driven into the material of the box. The bottom end of said spring 37 carries a horizontal flange 40 forming a closure 40 which extends each side of the spring plate 37 in the space provided by cutting away the flange 28 as indicated at 30. This horizontal closure is thus in the plane of the flange 28 and acts not only to obstruct the entrance of light through the slot 22 but also, by means of its extensions at each side of said slot, to prevent the entrance of light at the edges of said slot.

The spring 37 is so bent and formed (see Figs. 3 and 4) that it will normally be held in engagement with the beveled or cutaway part 26 of the frame 15 forming the rear wall of the lower end of the slot 22. In this position the flange 40, as illustrated in Fig. 3, will prevent the entrance of light into the camera box through the slot 22 and the felt blocks 34 and 36, being engaged snugly against the rear face of the spring, will offer further obstruction to the entrance of the light.

The slot thus described provides an entrance for a printing slide or plate 41. This plate may be made of any suitable transparent or semi-transparent material and as the most convenient material I prefer the use of celluloid. As shown, the plate consists of a narrow strip of celluloid 42 and of a hand or thumb piece 43 fixed to the outer or top end thereof. This strip is so designed that it may be inserted into the slot 22 heretofore described, its end passing through the slot 32ª in the plate 32, through the slit 33 and between the springs 37 and the felt blocks 34 and 36 and down beyond the end of the spring 37, as illustrated clearly in Figs. 1 and 4.

The part of the strip, which, when inserted extends into the exposure area, is left transparent while the part above said area and between said area and the thumb piece 43, that is to say, the part 42ª, is covered with opaque, light obstructing material, and the thumb piece 43 is made preferably so as to overlap and close the slot 32ª in the metal plate 32. Thus when the printing plate or slide is inserted into the slot, the opaque part 42ª and the head or thumb piece 43 will prevent the entrance of any light through the printing plate or slide itself. The thumb piece 43 also acts as a stop to limit the insertion movement of the slide.

On the transparent part 42 of the plate is printed or stenciled or written the identifying number or character. Manifestly as this part of the slide is in the exposed space in front of the film, the identifying character or number will be photographed on the film when the exposure is made and will be developed with the picture. Thus the picture and the identifying character are produced on the film simultaneously and with the same exposure.

The number may be written upon the transparent or translucent end 42 of the slide by pencil, ink or otherwise, the surface being specially prepared for the purpose or it may be printed or otherwise made thereon permanently. In the latter case it will be necessary for the one using the device to carry a number of the plates or slides, say, for example, those numbered one to ten, or twelve, depending upon the number of exposures on the films used.

The convenience and ease with which pictures and films may be afterward identified will be apparent, as a more complete record kept in a book or the like may be identified by means of the numbers or characters photographed on the films.

If desired, a slide having a longer transparent part 42 may be used in order that more complete data may be made to appear directly upon the film. This modification of the construction is shown in Fig. 8 wherein there appears in dotted lines a longer printing slide or plate 41$^a$, having a transparent or translucent part 42$^x$, which is adapted to extend substantially completely across the exposure area of the film. This is constructed in the same way as before. In view however, of the length of the transparent part 42$^x$, when it is inserted into the slot 22, some space of time will pass during the insertion of the slide when the transparent part will span the space between the exposure area and the outer open end of the slot 22. As this may result in the admission of a slight amount of light, it is preferable and necessary when using this type of the construction to provide a small elongated bag 44 to inclose the slide and cover or inclose the outer open end of the slot 22 during the time of inserting the slide and of withdrawing it. This will absolutely prevent the entrance of light.

With such a slide the photographer will have space enough to write considerable data which may be photographed directly upon the film when the picture is taken.

In order to insure the close engagement of the film with the printing slide or plate 42, and thus prevent offsetting of the characters borne thereby, I prefer, in addition to the spring 37 which is intended to produce a close contact between the said printing plate or slide and the film, to provide a light flat spring plate 50 which is attached to the rear closure wall 11 and which has a rounded end 51 which engages the rear face of the film or rather the light obstructing paper covering the film in the neighborhood of the upright member of the frame 41. This spring acts on the drag or pulling end of the film and insures a close contact of the film with the printing slide or plate.

While in describing my invention, I have referred to certain details of mechanical construction and arrangement, it is to be understood that the invention is to be in no way limited thereby except as may be pointed out in the appended claims.

I claim as my invention:—

1. In a camera, the combination with a camera box, of a sensitized-member supporting-frame adapted to contact with and define the exposure area of a contained sensitized-member, said box having a slot opening through one wall thereof, said slot extending parallel to and in close proximity to the plane of such sensitized member, means for obstructing the entrance of light through said slot, a printing slide adapted to be inserted through said slot and to project into the exposure area, said slide comprising an opaque, light obstructing part of a length equal to that of said slot, and a translucent extension adapted to project into the exposure area, said extension being capable of being written upon, and means for limiting the insertion movement of said printing slide.

2. In a camera, the combination with a camera box, of a sensitized-member supporting-frame adapted to contact with and define the exposure area of a contained sensitized-member, said box having a slot opening through one wall thereof, said slot extending parallel to and in close proximity to the plane of such sensitized-member, means for obstructing the entrance of light through said slot, a printing slide of less area than the exposure area, adapted to be inserted through said slot and to project into the exposure area so as to be exposed at the time of exposure of said sensitized-member, and means for holding said printing slide in close engagement with said sensitized-member.

3. In a camera, the combination with a camera box, of a sensitized-member supporting-frame adapted to contact with and define the exposure area of a contained sensitized-member, said box having a slot opening through one wall thereof, said slot extending parallel to and in close proximity to the plane of such sensitized-member, means for obstructing the entrance of light through said slot, a printing slide of less area than the exposure area, adapted to be inserted through said slot and to project into the exposure area so as to be exposed at the time of exposure of said sensitized-member, means for holding said printing slide in close engagement with said sensitized-member, and means for limiting the insertion movement of said slide when inserted through said slot, said limiting means acting to close the outer end of said slot.

4. In a camera, the combination with a camera box, of a sensitized-member supporting-frame adapted to contact with and define the exposure area of a contained sensitized-member, said box having a slot opening through one wall thereof, said slot extending parallel to and in close proximity to the plane of such sensitized-member, means for obstructing the entrance of light through said slot, a printing slide adapted to be inserted through said slot and to project into the exposure area, said slide consisting of a strip of celluloid, of means applied to said celluloid strip throughout a length equal to that of said slot, to obstruct the entrance of light through said celluloid strip, and a thumb piece attached to the end of said strip to limit its insertion movement.

5. In a camera, the combination with a camera box, of a sensitized-member supporting-frame adapted to contact with and define the exposure area of a contained sensitized-member, said box having a slot opening through one wall thereof, said slot extending parallel to and in close proximity to the plane of such sensitized-member, a felt strip closing the top of said slot and provided with a slit registering with said slot, a slotted plate attached to said wall and rigidly securing said strip in place, one or more felt strips let into the said wall and extending into said slot, a flat spring depending through said slot and engaged with said felt strips, and a printing slide adapted to be inserted through said slot and to project into the exposure area.

6. In a camera, the combination with a camera box, of a sensitized-member supporting-frame adapted to contact with and define the exposure area of a contained sensitized-member, said box having a slot opening through one wall thereof, said slot extending parallel to and in close proximity to the plane of such sensitized-member, a felt strip closing the top of said slot and provided with a slit registering with said slot, a slotted plate attached to said wall and rigidly securing said strip in place, one or more felt strips let into said wall, and extending into said slot, a flat spring depending through said slot and engaged with said felt strips, said flat spring having a flange at the bottom adapted to normally close said slot, and a printing slide adapted to be inserted through said slot and to depend into the exposure area.

7. In a camera, the combination with a camera box, of a sensitized-member supporting-frame adapted to contact with and define the exposure area of a contained sensitized-member, said box having a slot opening through one wall thereof, said slot extending parallel to and in close proximity to the plane of such sensitized-member, a felt strip closing the top of said slot and provided with a slit registering with said slot, a slotted plate attached to said wall and rigidly securing said strip in place, one or more felt strips let into said top wall and extending into said slot, a flat spring depending through said slot and engaged with said felt strips, said flat spring having a horizontal flange adapted to close the bottom end of said slot, said flange extending at either end of said slot beyond the edges thereof, and a printing slide adapted to be inserted through said slot and to project into the exposure area.

In testimony that I claim the foregoing as my invention I affix my signature in the presence of two witnesses, this 9th day of December, A. D. 1915.

AUGUST J. OEHRING.

Witnesses:
T. H. ALFREDS,
KARL W. DOLL.